United States Patent
Leung (10) Patent No.: US 6,961,833 B2
(45) Date of Patent: Nov. 1, 2005

(54) METHOD AND APPARATUS FOR PROTECTING DATA IN COMPUTER SYSTEM IN THE EVENT OF UNAUTHORIZED DATA MODIFICATION

(76) Inventor: Kwok-Yan Leung, 53 Applegate Cres, Willowdale, ON (CA), M2H 2R5

( * ) Notice: Subject to any disclaimer, the term of this patent is extended or adjusted under 35 U.S.C. 154(b) by 307 days.

(21) Appl. No.: 10/351,039

(22) Filed: Jan. 24, 2003

(65) Prior Publication Data

US 2004/0148478 A1 Jul. 29, 2004

(51) Int. Cl.[7] .............................................. G06F 12/00
(52) U.S. Cl. ................................. 711/163; 711/173
(58) Field of Search ............................... 711/173, 163, 711/129, 152, 153, 480, 490; 713/200, 168; 709/229, 226; 463/29; 345/544

(56) References Cited

U.S. PATENT DOCUMENTS 5,564,040 A * 10/1996 Kubala ..................... 711/173
5,890,014 A * 3/1999 Long ............................. 710/8
6,052,781 A * 4/2000 Weber ......................... 713/200
6,345,346 B1   2/2002 Biessener et al. ........... 711/162
6,488,581 B1 * 12/2002 Stockdale .................... 463/29
6,615,350 B1 * 9/2003 Schell et al. ................ 713/168
2002/0161891 A1 * 10/2002 Higuchi et al. ............. 709/226

* cited by examiner

*Primary Examiner*—Pierre M. Vital
*Assistant Examiner*—Mardochee Chery (57) ABSTRACT

A data protection controller is interposed between a storage device and a main board of a comprising system for protecting data from unauthorized modification. The controller partitions the storage device into a read-only zone, a sketch zone, an admin zone and an unprotect zone. The data to read from the read only zone is written into the sketch zone first. The data in the sketch zone is then transmitted to the computing system. The data which is intended to be recorded in the read only zone is redirected to the sketch zone for recording. A location table in the admin zone is used to indicate if the sketch zone contains valid data or not. In a RAM Disk Mode, the data in the sketch zone is discarded when a new user session is started. In a Live Disk Mode, the data in the sketch zone is maintained.

5 Claims, 4 Drawing Sheets

METHOD AND APPARATUS FOR PROTECTING DATA IN COMPUTER SYSTEM IN THE EVENT OF UNAUTHORIZED DATA MODIFICATION

FIELD OF THE INVENTION

The invention relates to a controller interposed between a storage device and a computing system. The controller can transform a single hard disk drive (HDD) into multiple virtual hard disk drives (at least two virtual HDD). The host computing system treats each virtual HDD as an individual HDD.

BACKGROUND OF THE INVENTION

Most modern computer systems utilize various types of memory for handling data. Consequently, the first problem that is encountered in this environment is unauthorized modification of the data storage. In some cases, such modifications are intentional, as in the case of a user modifying the configuration of a software program or writing new data in the memory. Often these "friendly" modifications cause undesirable results that make the restoration of the computer configuration necessary. In other cases, the modifications may be malicious, as in the case of the deletion or modification of data storage by a virus or an unauthorized person. In general, these malicious modifications cause undesirable consequences, which may be destructive and substantial.

Consequently, unauthorized modification results in lower productivity, revenue and profits of computer users, especially in a business situation. In enterprise computing situations where a number of persons are provided with computer systems, it is often desirable that each of the computers has the same configuration. This allows the systems to be configured and used uniformly. It is not desirable that each user provided with such a computer modifies the configuration to suit their personal preferences, since this may results in several problems. First, it may cause incompatibility among the computer systems. Second, it may prevent another user from operating the modified computer in a uniform way. Third, it makes the modified computer unable to operate, thus reducing productivity and requiring costly attention from the manager.

In other cases, it may be desirable to allow users to renew data on a storage medium, but to provide a "snapshot" of the data storage from a point at which it was properly configured. In this case, the user may modify the configuration of the computer by adding, deleting or updating software or by editing data on the storage medium. If the user's modification causes the computer unable to operate, then the data on the storage medium can be restored to the previous state at the time of the snapshot.

Several devices that attempt to prevent unauthorized modification of software and data stored on a computer hard disk drive are available. Some of these devices attempt to provide a combined hardware/software solution to the problem described above. Other devices attempt to provide only a software solution.

Systems, which rely only on software protection, will typically intercept any attempt to write data onto or read data from the hard disk drive. The data is written onto a special storage area but the original data on the hard disk drive is not modified. If the written data is requested in a subsequent data read request, it is read from the special storage area rather than from the hard disk drive. The newly written data may be accessed only during the same session of computer use and is deleted or discarded when the computer is re-started or on request. However, this solution has a substantial disadvantage. Malicious software programs, such as viruses, can detect the presence of the protective software and either circumvent or disable it. The malicious software can then proceed to make modifications to the data recorded on the hard disk drive, potentially causing the problems set out above. Furthermore, a software solution is generally operating system and/or processor dependent.

Systems, which provide a combined hardware and software solution will typically include a card that fits into a PCI or other expansion, slot on a computer and a software package. The software package is used to configure the card and may also be used to intercept read and write requests and direct them to a processor on the card. These systems are similarly susceptible to detection by malicious software and may also be circumvented.

Accordingly, there is a need for a data protection system which is not operating system or processor dependent and which cannot be circumvented or disabled by malicious software or a malicious user.

SUMMARY OF THE INVENTION

The present invention provides a controller that is interposed between a computing system and a data storage device. The primary object of this invention is to provide a protective circuit for protecting data. The controller is irrespective of any operating system or driving program. The protective circuit comprises a controller-processor interface, a controller-storage interface, and a microprocessor connected with a RAM, an EPROM and a signal processor. The controller-processor interface is coupled to the processor-storage interface of a processor of the main board in the computing system through a controller-processor data bus, and the controller-storage interface is coupled to a storage interface of the storage device through a controller-storage device data bus.

The controller will prevent any data changes on a read only storage zone. Any changed data will be saved and relocated to a sketch storage zone. The controller will determine and provide the latest updated data to a user. The controller's RAM Disk Mode operation will clear all changes if the system reboots or powers down. The controller's Live Disk Mode operation will not clear any changes when the system reboots or shuts down. If needed, the controller can perform synchronization and permanently save changed data into the read only storage zone. If the system or data is corrupted, system can start a new session from read only storage zone with the last synchronization data.

A configuration mode is used to configure the controller with a storage device that will be created with four data storage zones, which include a read only zone, a sketch zone, an admin zone and an unprotect zone. A read only zone is storage for protecting data, which will not be changed. A sketch zone is storage for the temporary data. An admin zone is storage for a configuring table and a changing location table. An unprotect zone is storage for general purpose data. After the configuration, the controller presents the storage device to the processor as only having a capacity of the read only zone and the unprotect zone and conceals the rest of storage capacity.

An installation mode is used to record data (which may include operating system software, application software and data) in the read only zone.

In a RAM Disk Protect Mode, the read only zone will be protected. The data that is read from the read only zone, as well as data which is intended to be recorded in the read only zone is redirected to the sketch zone for recording. During the same session of use of the computing system, the sketch zone is used in preference to the read only zone, allowing the sketch data to be reviewed and modified. However, at the beginning of each new session the location table in the admin zone is emptied by the controller, so the sketch zone is ignored and treated as it is empty. Any data recorded in the sketch zone during the previous session is discarded. The controller thus eliminates the effect of undesired changes to the protect data by unauthorized users end malicious software such as viruses.

In a Live Disk Protect Mode, the read only zone will be protected. The data that is read from the read only zone, as well as data which is intended to be recorded in the read only zone is redirected to the sketch zone for recording. During the same session of use of the computing system, the sketch zone is used in preference to the read only zone, allowing the sketch data to be reviewed and modified. The changes to the sketch data space are not discarded at the beginning of each session. The data recorded during the previous session is also maintained at the start of each session, and therefore the changed data can continue to be used. If needed, the controller can perform synchronization and permanently save changed data into the read only zone. When system or data is corrupted, the controller may be instructed to discard the sketch data by emptying a location table so that the sketch zone is ignored and treated as it is empty. So the system can start a new session from read only storage zone with the last synchronization data.

The controller also allows a user to record data in the unprotect zone which is not discarded when the sketch zone is discarded. The controller is to present read only zone and unprotect zone to the processor as separate storage devices, even though they may in fact be located in separate logical partitions on a single physical storage device.

BRIEF DESCRIPTION OF THE DRAWINGS

A preferred embodiment of the present invention will now be described in detail with reference to the drawings, in which.

DETAILED DESCRIPTION OF THE INVENTION

Figure 1:
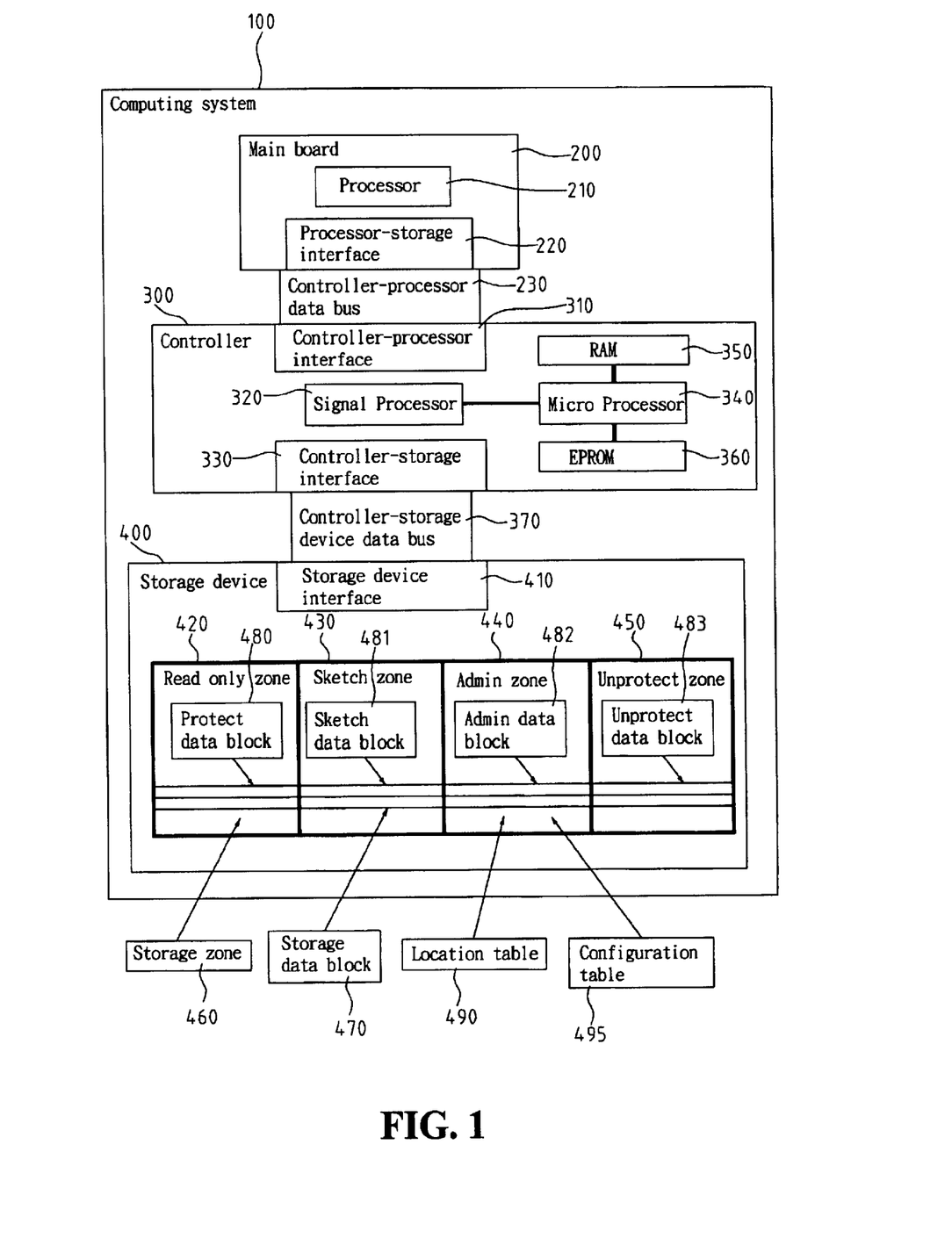
FIG. 1 is a block diagram of a first computing system incorporating a first embodiment of a storage firewall controller according to the present invention.

Reference is first made to FIG. 1, which illustrates a computing system 100 incorporating a first embodiment of a controller 300 according to the present invention. Computing system 100 includes a processor 210 and a storage device 400.

Computing system 100 may be any type of device that requires software and/or data to be stored in a storage device. For example, computing system 100 may be a typical personal computer. In this case, processor 210 will be the microprocessor that operates the computer, and data storage device 400 may be a hard disk drive (HDD) or other storage device. As another example, computing system 100 may be a game console. In this case, processor 210 will be the microprocessor or micro controller, which operates the console and data storage device 400, may be a solid state memory device such as a "memory stick", etc.

Processor 210 is coupled to a controller-processor interface 310 of controller 300 by a controller-processor data bus 230. Processor 210 makes read data requests and write data requests to controller 300 using controller-processor data bus 230. A controller-storage interface 330 of controller 300 is coupled to a storage device interface 410 of data storage device 400 by a controller-storage device data bus 370. Controller 300 reads data from and writes data to data storage device 400 using controller-storage device data bus 370, based on read data and write data requests received from processor 210.

Preferably, controller-processor interface 310 of controller 300 is identical to storage device interface 410 of storage device 400. This allows controller 300 to be interposed in the coupling between processor 210 and storage device 400.

Storage device 400 contains a data storage space 460, which is divided into a number of data blocks 470, each block being capable of recording a limited amount of data. Blocks 470 may be designated to be protect data blocks 480, sketch data blocks 481, admin data blocks 482 and unprotect data block 483. Data storage space 460 is divided into four data zones: a read only zone 420 comprising protect data blocks 480, a sketch zone 430 comprising sketch data blocks 481, an admin zone 440 comprising admin data blocks 482 and an unprotect zone 450 comprising unprotect data blocks 483. Preferably, the number of protect data blocks 480 in read only zone 420 is equal to the number of sketch data blocks 481 in sketch zone 430 so that each sketch data block 481 corresponds to a protect data block 480.

Admin zone 440 contains a location table 490 and a configuration table 495. The location table 490 contains each sketch data block address that is used to indicate which corresponding sketch data block 481 contains valid data. Typically, the location table 490 will contain one bit corresponding to each sector of sketch data block 481. If a particular bit is set to "1", then the corresponding sketch data sector of block 481 contains valid data. If the bit is set to "0", the corresponding sketch data sector of block 481 does not contain valid data. If a particular bit is set to "1", the controller will read data from sketch zone 430. If a particular bit is set to "0", the controller will read data from read only zone 420, make a copy of the read data onto the sketch data sector, and set the particular bit as "1", then the controller gets the data from the sketch data section 430. The configuration table 495 is recorded with the configuration, parameter and size of storage zone: read only zone 420, sketch zone 430, admin zone 440 and unprotect zone 450.

An example of a computing system 100 will now be described. The example comprises a typical computer system (not shown) suitable for use in an office environment. The exemplary computer system uses the Microsoft Windows™ operating system. The processor 210 of the computer system is the microprocessor used to execute software and control peripheral devices. The data storage device 400 of the computer system is a single IDE-type HDD. The IDE-type HDD is operated by an IDE controller coupled between the processor at the HDD itself.

In the exemplary computer system, data protection controller 300 is coupled between the IDE controller and the HDD. Data protection controller 300 is transparent to the IDE controller. From the IDE controller's perspective, it appears to be communicating directly with the IDE HDD. As is more fully described below however, data protection controller 300 in fact conceals at least a part of the IDE HDD from the IDE controller and may actually pretend to be two separate physical HDD.

The operation of controller 300 will now be explained.

The controller divides the single HDD into four distinct logical partitions. The first partition is the read only zone 420, the second partition is the sketch zone 430 the third partition is the admin zone 440 and the fourth partition is unprotect zone 450. The blocks 470 that comprise the first partition are the read only blocks 480. The blocks 470 that comprise the second partition are the sketch blocks 481. The blocks 470 that comprise the third partition are the admin blocks 482. The blocks 470 that comprise the fourth partition are the unprotect blocks 483. The four partitions are physically located in the data storage space of the HDD and actually are physically interleaved with one another. As noted above, the number of read only protect blocks 480 and the number of unprotect blocks 483 are preferably equal, and preferably, there is a one-to-one relationship between the read only blocks 480 and the unprotect blocks 483.

In use, read only zone 420 contains protect data that is to be protected from alteration or deletion. Typically, a system administrator installs this protect data for the use of a user to whom computing system 100 is provided. Methods 101 and 201, described below, set out a procedure for installing the protect data in read only zone 420.

During each session in which computing system 100 is used, controller 300 initially considers sketch zone 430 to be blank. The entire location table 490 is set to "0", indicating that each sketch block 481 does not contain valid data.

When processor 210 makes a write request to add to, modify or delete the protect data, the change is not recorded in the protect data block 480 in read only zone 420, but is recorded only in the corresponding sketch data blocks 481 in sketch zone 430 as sketch data. The location table 490 in admin zone 440 is updated to indicate that the sketch data block contains valid data.

Thus if processor 210 makes a read request for a protect data file (i.e. a word processor document), controller 300 reads the file from one or more protect data blocks 480 in read only zone 420 and loads the data onto the corresponding sketch data blocks 481 in sketch zone 430, and sets the corresponding bit value in the location table 490 in admin zone 440 as "1", then the controller 300 provides the data read from sketch zone 430 to processor 210.

Since sketch zone 430 is considered to be blank at the start of each session during which computing system 100 is used, when a new session is started (for example, by turning computing system 100 off and on), the modified data file is lost. The original data file, which is still recorded in read only zone 420 as protect data, is treated as the current version of the data file.

When a read data or write data request is received relating to unprotect zone 450, controller 300 passes the request to data storage device 400 with translated address command request. This assumes that data storage device 400 is an intelligent device capable of independently satisfying read data and write data requests. The IDE HDD of the exemplary computer system is capable of such tasks. However, if controller 300 is used with a data storage device, which requires storage device 400 to directly, control its read and write operations, controller 300 may be configured to do so, according to any data storage protocol. The operation of controller 300 in response to read data and write data requests is explained below in reference to method 301.

Figure 2:
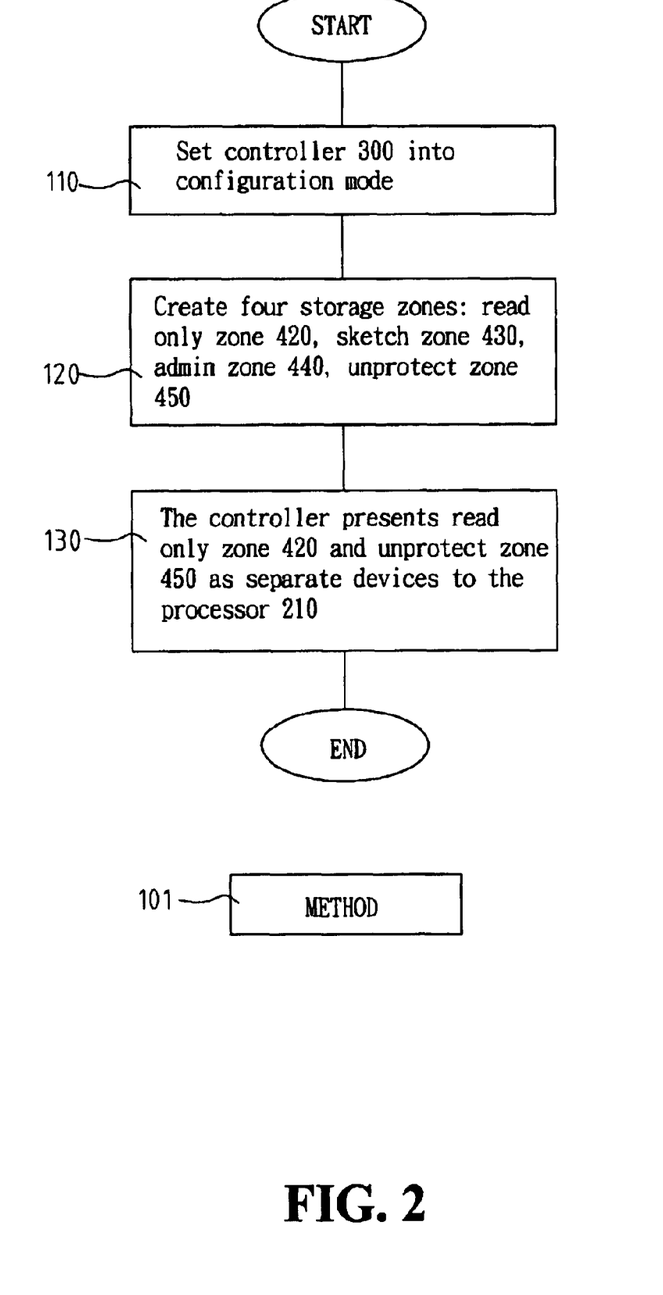
FIG. 2 illustrates a configuration method according to the present invention.

Reference is next made to FIG. 2, which illustrates a method 101 of configuring data storage device 400 so that data may be recorded in data storage space 460. A user carries out Method 101 under the control of a system administrator, who configures computing system 100 for use.

Method 101 begins in step 110 in which controller 300 is set a configuration mode by the administrator. Typically, the administrator will put controller 300 into the configuration mode by executing configuration software provided with controller 300 for this purpose. Preferably, the remainder of method 101 is performed under the control of the Configuration Software. The Configuration software is preferably provided with a password mechanism that prevents controller 300 from being put into configuration mode unless a correct password is provided. Also, preferably, controller 300 may only be put into configuration mode if the Configuration software is executed when computing system 100 is turned on.

Method 101 next proceeds to step 120. In this step, the data storage space 460 of data storage device 400 is divided into four zones: read only zone 420, sketch zone 430, admin zone 440 and unprotect zone 450. Controller 300 displays a dialog box asking the administrator what size read only zone 420 is to be. In response to the selected size of read only zone 420, controller 300 creates the read only zone 420 and automatically creates the sketch zone 430 to be the same size as read only zone 420. Controller 300 calculates the remaining space on data storage device 400, creates the balance available size for unprotect zone 440 and admin zone 440. Controller 300 now treats the four zones as four individual storage devices.

Method 101 next proceeds to step 130 in which controller 300 indicates to processor 210 that computing system 100 contains two storage devices, which may be referred to as read only storage device and unprotect storage device. Controller 300 indicates to processor 210 that the first data storage device in computing system 100 has a capacity equal to that of read only zone 420 and that the second data storage device in computing system 100 has a capacity equal to that of unprotect zone 450. Depending on the data I/O protocol used in computing device 100, controller 300 may be required to report specific characteristics of each of the two data storage devices it reports to processor 210. For example, controller 300 may be required to report a number of tracks, sectors and sector size that corresponds to the claimed size of each of the two data storage devices. Controller 300 is configured to determine values for these characteristics that correspond to the sizes of data storage devices (i.e. to the sizes of read only zone 420 and unprotect zone 450) and report them to processor 210. The values reported will exclude sketch zone 440 and admin zone 440. Depending on the data I/O protocol used by computing system 100, processor 210 may subsequently identify the data storage devices using different references. For example, the two data storage devices have different drive letters and drive numbers. Controller 300 will receive read data and write data requests for the different drive letters arid translate them for use on the appropriate partition of the IDE HDD.

Since sketch zone 430 is concealed from processor 210, the effective usable storage data space on data storage device 400 is reduced by the size of sketch zone 430. For example, if data storage device 400 has a data storage space 470 with a capacity of 10 Megabytes (Mb). If read only zone 420 is selected to have a data capacity of 4 Mb, then read only zone 420 and sketch zone 430 will both have a data capacity of 4 Mb each. The remaining space of 2 MB will be allocated as admin zone 440 and unprotect zone 450. Sketch zone 430 and admin zone 440 are concealed from processor 210. Read only zone 420 appears to processor 210 as a 4 MB Hard Disk Drive (0) and unprotect zone 430 appears to processor 210 that must be less than 2 MB Hard Disk Drive (1) and depend on admin zone 440 using of capacity.

Method 101 then ends.

After method 101 has been completed, processor 210 will operate as though computer system 100 contains two separate data storage devices. In the case of the exemplary computer system with a single IDE HDD divided into four zones or four partitions. The processor 210 will see the read only zone 420 as a first physical drive with a separate drive letter and drive number (i.e. drive letter C: and drive number 0). The processor 210 will see unprotect zone 450 as a second physical drive with a separate drive letter and drive number (i.e. drive letter D: and drive number 1). Processor 210 is unable to access sketch zone 430 and admin zone 440, since processor 210 has no drive letter or drive number with which to refer to this zone.

Method 101 may be repeated to vary the size of the improtect zone 450, the sizes of the read only zone 420, the sketch zone 430 and admin zone 440. If method 101 is performed for the first time on a data storage device 400 that already contains data. Method 101 may be configured to move this data into read only zone 420 or unprotect zone 450, to the extent that the data fits in those data spaces, or to other data storage devices. If method 101 is performed on a HDD subsequently and the size of read only zone 420, or unprotect zone 450 is reduced so that the existing data in the data space will no longer fit, then some of this data may be lost, or alternatively, may be copied to a different location.

Figure 3:
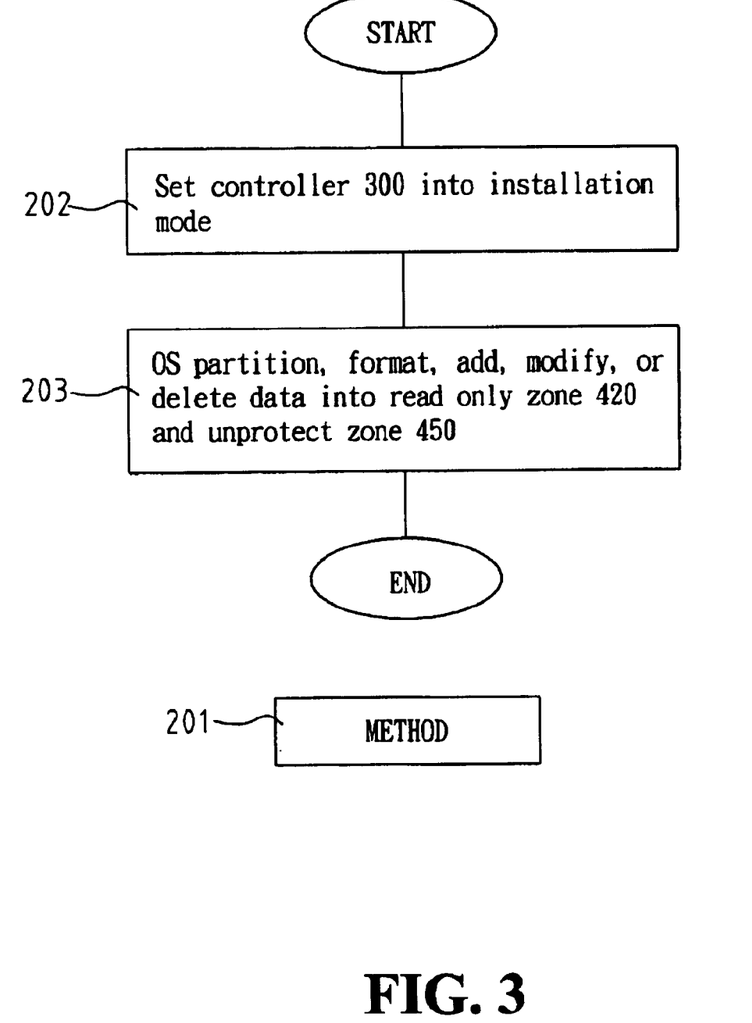
FIG. 3 illustrates an installation method according to the present invention.

Reference is next made to FIG. 3, which illustrates a method 201 for installing data in the read only zone 420 of data storage device 400. Method 201 is also typically carried out under the control of the system administrator.

Method 201 begins in step 202, in which controller 300 is set into an installation mode by the administrator. In the exemplary computer system this is accomplished by inserting a diskette containing setup software, which initializes a procedure contained in controller 300, into the diskette drive prior to boot-up. The installation procedure preferably includes a password protection mechanism requiring the administrator to enter a password before controller 300 will enter the installation mode. Preferably, controller 300 can only be put into installation mode when computer system 100 is turned on.

Method 201 next proceeds to step 203, in which the administrator may load data into read only zone 420. For example, the administrator may load an operating system used for processor 210 and other parts of computing system 100 (not shown), application software such as word processors, games or communication software and data files. The specific data loaded into read only zone 420 would depend on the nature and intended use of computing system 100. During installation mode, the administrator may also OS partition, format, add, delete and modify in read only zone 420. During step 203, the administrator does not record any information in sketch zone 430.

In the exemplary computer system, step 203 may involve the installation of an operating system such as Microsoft Windows™ and application software such as Microsoft Word™ on the IDE HDD. Other software and data may also be installed in the read only zone 420. The processor 210 will typically see and refer to the read only zone as drive letter C.

Method 201 ends when the administrator has completed the installation of protect data into read only zone 420. Once method 201 ends, data recorded in read only zone 420 is referred to as protect data.

Once the protected data has been installed in read only zone 420, computing system 100 is ready for normal operation. Typically, computing system 100 Will be provided to a user at this stage for regular use. The administrator to modify the contents of read only zone 420 may repeat Method 201. The administrator does not record any information that is to be in sketch zone 430.

Figure 4:
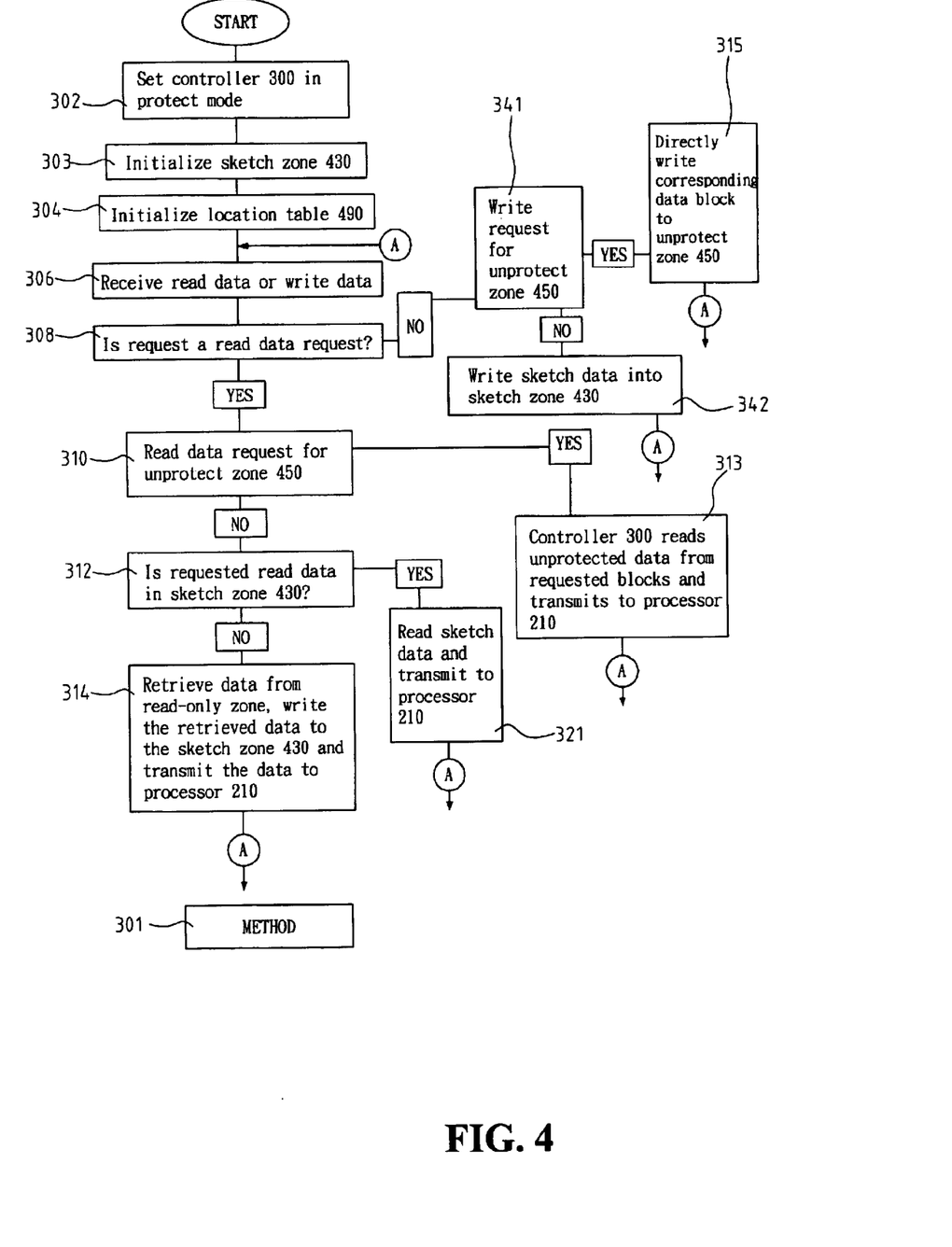
FIG. 4 illustrates the operation of the controller of FIG. 1 in a protect mode.

Reference is next made to FIG. 4, which illustrates a method 301 by which controller 300 operates during its normal operation. In method 301, a request from processor 210 for data previously recorded in data storage device 400 is referred to as a "read request" and the requested data is referred to as "read data". A request from processor 210 to record data in data storage device 400 is referred to as a "write request" and the data to be written is referred to as "write data".

Method 301 begins in step 302, in which controller 300 is set to a protect mode. In step 302 controller 300 is configured to automatically enter protect mode when a session of use of computing system 100 is initiated, unless controller 300 is specifically put into configuration mode (method 101) or installation mode (method 201). A session of use of computing system 100 is typically initiated by turning computing system 100 on or by resetting it.

Method (301) next proceeds to step 303, in which controller 300 initializes sketch zone 430. Controller 300 sets the value of every bit in location table 490 on admin zone 440 to "0" to indicate that all of the sketch data blocks 481 do not contain valid data. The effect of step 303 is that any sketch data recorded in sketch zone 430 during a previous session of use of computing system 100 is effectively discarded. Controller 300 does not actually delete the contents of every sketch data block 481, since that may require a substantial amount of time, causing the start up procedure of computing system 100 to be substantially lengthened. However, such a deletion is not necessary. Controller 300 will ignore any data that was recorded in a sketch data block 481 since each block is marked as "not valid" in location table 490 on admin zone 440.

Some computing systems allow a processor 210 to make "low-level" data I/O requests by specifically directing a data storage device 400 to access a specific part of its data storage space 460. For example, a processor 210 may instruct an IDE HDD to provide contents of a specific block 470 based on a physical track and sector number. When used with an IDE HDD, controller 300 will have reported track and sector limitations corresponding to the sizes of read only zone 420 and unprotect zone 450 to processor in step 130.

Method 301 next proceeds to step 304. In this step, controller 300 will initialize the location table 490 on admin zone 440.

Method 301 next proceeds to step 306 in which controller gets either read request or write request from processor 210

Method 301 next proceeds to decision step 308. If the request received in step 306 is a read request, method 301 proceeds to decision step 310. Otherwise, method 301 proceeds to decision step 341.

In decision step 310, the read request is reviewed. If the read request is for unprotect data recorded in unprotect zone 450, then method 301 proceeds to step 313. Otherwise, method 301 proceeds to decision step 312.

In decision step 312, controller 210 reviews location table 490 on admin zone 440 to determine if the read data requested by processor 210 is recorded in sketch zone 430. If so, method 301 proceeds to step 321. Otherwise, method 301 proceeds to step 314.

Method 301 next proceeds to step 314, in which the controller reads the protect data from read only zone 420, writes the read data onto the corresponding sketch data block 481 in sketch zone 430, and sets the corresponding bit value in the location table 490 in admin zone 440 as "1", then the controller 300 provides the data read from sketch zone 430 to processor 210.

Method 301 next returns to step 306 to await the next request from processor 210.

In step 321, controller 300 processes read requests for read data, which has previously been recorded in sketch zone 430. The read data, which is sketch data, may have been recorded in sketch zone 430. Step 342 (described below) is a step in which write data is written in sketch zone 430 in response to a write request from processor 210.

Controller 300 determines which sketch block or blocks 481 the requested sketch data is stored in. Controller 300 reads the data from these blocks and transmits it to processor 210.

Method 301 then returns to step 306 to await the next request from processor 210.

In step 313, controller 300 reads unprotected data from requested blocks and transmits the data to processor 210.

Method 301 then returns to step 306 to await the next request from processor 210.

In decision step 341, controller 300 begins the processing of a write request from processor 210. If the write request relates to unprotect data to be stored in unprotect zone 450, method 301 proceeds to step 315. Otherwise, the write data is to be recorded in sketch zone 430 and method 301 proceeds to step 342.

In step 342, controller 300 records the write data in the sketch data block or blocks 481. Controller 300 also updates location table 490 in admin zone 440 to indicate that the corresponding sketch data block or blocks now contain valid sketch data.

Method 301 then returns to step 306 to await the next request from processor 210.

In step 315, controller 300 processes write requests relating to unprotect zone 450. Controller 300 directly writes the corresponding data block to unprotect zone 450.

Method 301 then returns to step 306 to await the next request from processor 210.

When it is in protect mode, controller 210 does not write any data into read only zone 420. As a result, read only zone 420 always has the same contents that it had when method 201 ended (or was last performed to modify the contents of read only zone 420). During a single session of use of computing system 210, changes, additions and deletions to the protected data are recorded only in sketch zone 430 as sketch data in step 342. As far as processor 210 is concerned, it appears to be making regular read data and write data requests to data storage device 400, and these requests appear to be satisfied in a routine manner. However, when a new session of use of computing device 100 us initiated, all of these changes are lost, due to step 303.

An example with an IDE HDD has been provided. The present invention is equally suitable for use with other storage devices such as ISA, ATA, EIDE, SCSI and other hard disk drives. In addition, the invention is compatible with and suitable for any other data storage device, including solid state memory devices, including magnetic memory devices, flash cards, PC cards, etc.

In a RAM Disk Protect Mode, the read only zone will be protected. The data that is read from the read only zone, as well as data which is intended to be recorded in the read only zone is redirected to the sketch zone for recording. During the same session of use of the computing system, the sketch zone is used in preference to the read only zone, allowing the sketch data to be reviewed and modified. However, at the beginning of each new session the location table in admin zone is emptied by the controller, so the sketch zone is ignored and treated as it is empty. Any data recorded in sketch zone during the previous session is discarded. The controller thus eliminates the effect of undesired changes to the data by unauthorized users and malicious software such as viruses.

In a Live Disk Protect Mode, the read only zone will be protected. The data that is read from the read only zone, as well as data which is intended to be recorded in the read only zone is redirected to the sketch zone for recording. During the same session of use of the computing system, the sketch zone is used in reference to the read only zone, allowing the sketch data to be reviewed and modified. However, the changes to the sketch data space are not discarded at the beginning of next session. The data recorded during the previous session is also maintained at the start of each session, and therefore the changed data can continue to be used. If needed, the controller can perform synchronization and permanently save changed data into the read only zone. When system or data is corrupted, the controller may be instructed to discard the sketch data by emptying a location table so that the sketch zone is ignored and treated as it is empty. So the system can start a new session from read only storage zone with the last synchronization data.

What is claimed is:

1. A method for protecting data in a computer system having a storage device, a computing device and a data protection controller interposed between the storage device and the computing device, the method comprising the steps of:

executing a configuration procedure to create four virtual partitions including a read-only zone, a sketch zone, an admin zone and an unprotect zone in the storage device;

loading protected data to the storage device; and executing a data protection procedure including the steps of:

(a) setting the protection controller to a data protection mode;

(b) initializing the sketch zone;

(c) initializing a location table in the admin zone;

(d) waiting until a write data request or a read data request is received;

(e) determining whether the received request is a read data request or a write data request, executing step (f) if the received request is a read data request, otherwise executing step (k);

(f) determining whether data requested by the read data request is in the unprotect zone or not, executing step (g) if data requested by the read data request is in the unprotect zone, otherwise executing step (h);

(g) retrieving the requested data from the unprotect zone, transmitting the retrieved data to the computing device, and returning to step (d);

(h) checking the location table to determine if the requested data has been written in the sketch zone;

(i) retrieving the requested data from the sketch zone, transmitting the retrieved data to the computing device and returning to step (d) if the requested data has been written in the sketch zone, otherwise executing step (j);

(j) retrieving the requested data from the read-only zone, writing the requested data into the sketch zone, updating the location table to indicate that the retrieved data from the read-only zone has been written in the sketch zone, transmitting the retrieved data to the computing device, and returning to step (d);

(k) determining whether the write data request is to write data to a section in the unprotect zone or not, executing step (l) if the write data request is to write data in the unprotect zone, otherwise executing step (m);

(l) writing data to the section in the unprotect zone and returning to step (d);

(m) writing data to a section in the sketch zone, updating the location table to indicate that the section in the sketch zone contains valid data, and returning to step (d).

2. A controller for protecting data in a computer system, comprising:

a controller-processor interface for coupling to a processor-storage interface of a main board of the computer system through a controller-processor data bus;

a controller-storage interface for coupling to a storage device interface of a storage device of the computer system through a controller-storage device data bus; and a signal processor controlling the controller-processor interface and the controller-storage interface for creating a read-only zone, a sketch zone, an admin zone and an unprotect zone in the storage device;

wherein when data in the read-only zone is requested by a read data request, the signal processor controls the storage device to retrieve the requested data from the sketch zone and transmit the requested data if the sketch zone contains the requested data, or to retrieve the requested data from the read-only zone, write the requested data to the sketch zone and then transmit the requested data if the sketch zone does not contain the requested data, and wherein when a write data request is to write data to the read-only zone, the signal processor controls the storage device to write data in the sketch zone instead of the read-only zone.

3. The controller as claimed in claim 2, wherein the signal processor has a first protection mode in which data in the sketch zone is discarded when a new user session is started, and a second protection mode in which data in the sketch zone is maintained when a new user session is started.

4. The controller as claimed in claim 2, wherein the admin zone comprises a location table for indicating where the sketch zone contains data and whether the contained data is valid.

5. The controller as claimed in claim 2, wherein the sketch zone and the read-only zone has identical storage capacity.

* * * * *